Figures 3, 4:
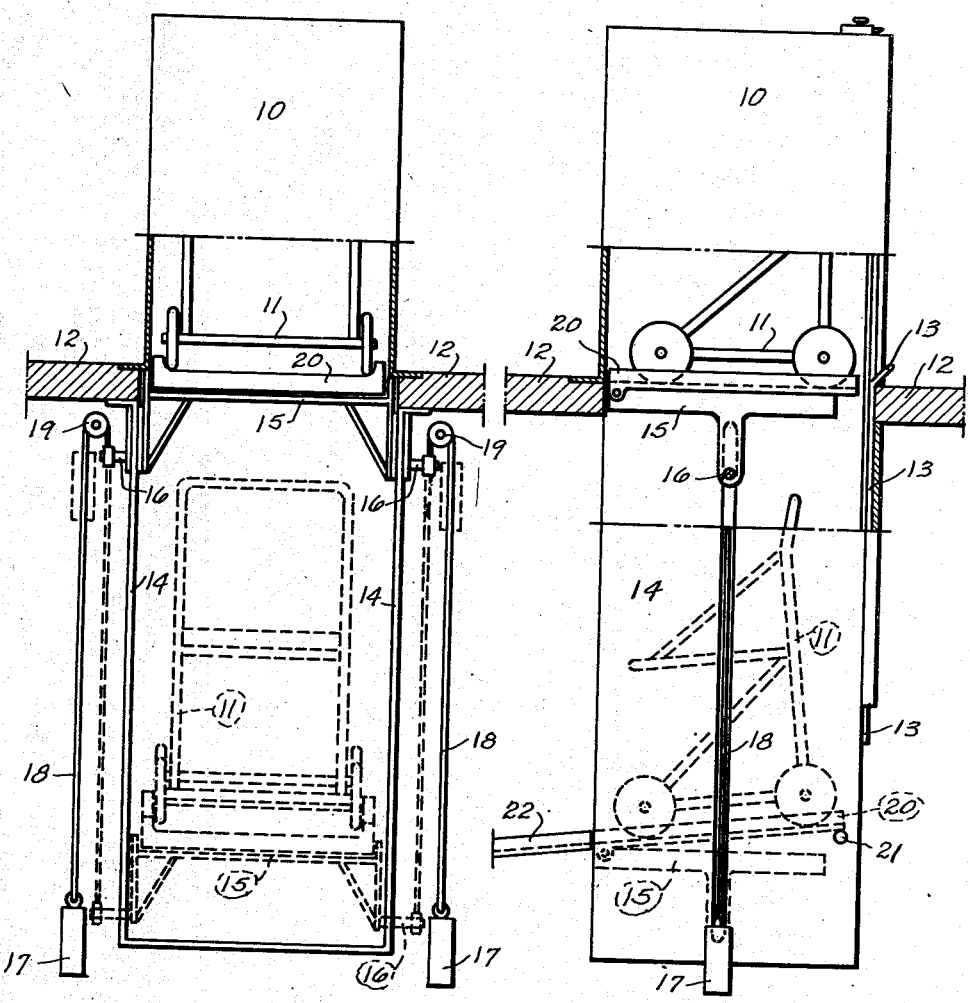

March 31, 1953  F. B. MARTIN  2,633,253
TRANSFER SYSTEM
Filed July 21, 1947  4 Sheets-Sheet 1
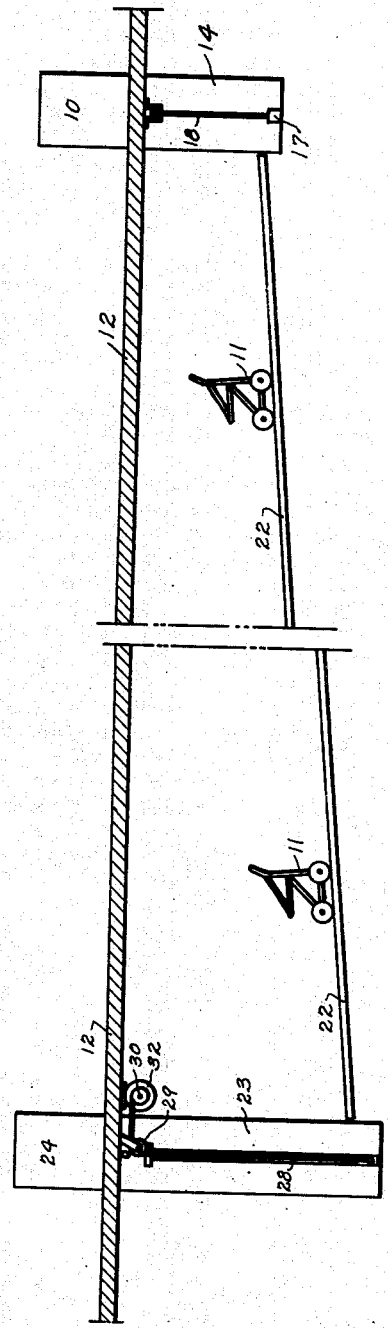
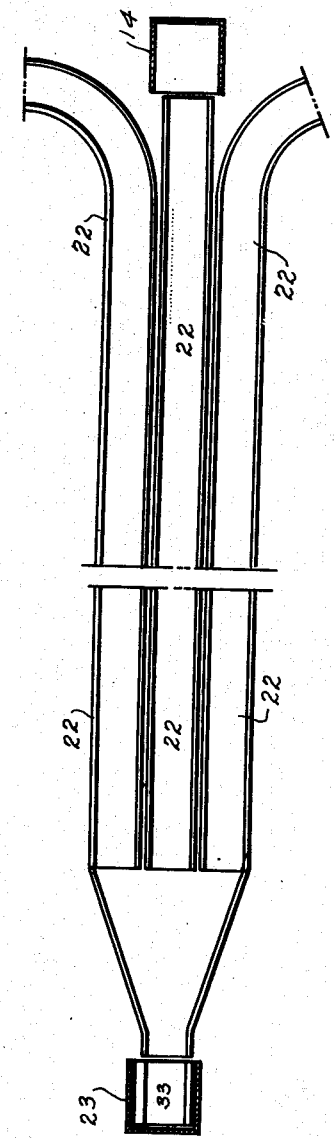
INVENTOR:
FRED B. MARTIN
BY
ATTORNEY March 31, 1953 F. B. MARTIN 2,633,253
TRANSFER SYSTEM
Filed July 21, 1947 4 Sheets-Sheet 2

INVENTOR:
FRED B. MARTIN
BY Homer H. Sweet
ATTORNEY

March 31, 1953
F. B. MARTIN
2,633,253
TRANSFER SYSTEM
Filed July 21, 1947
4 Sheets-Sheet 4
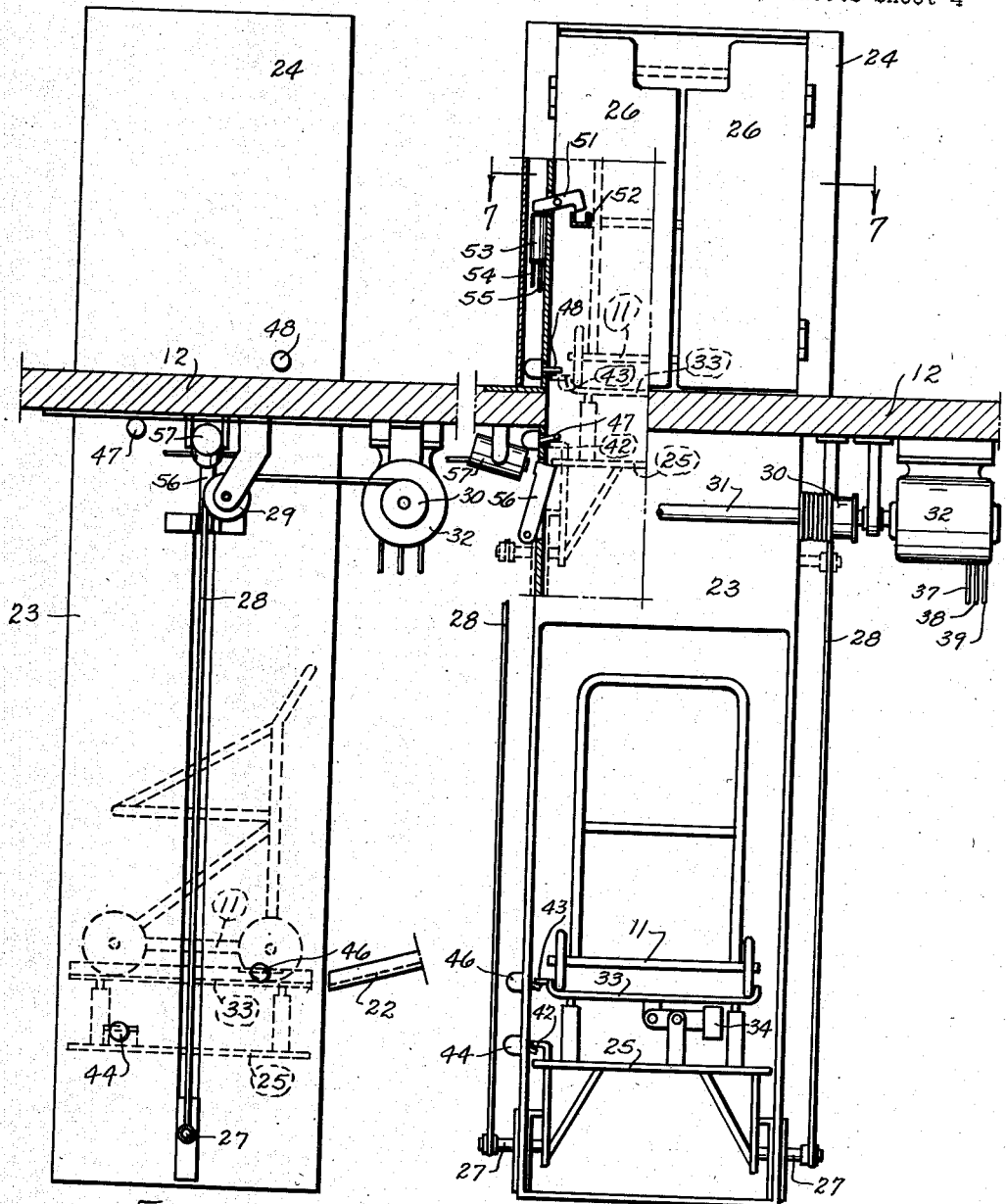
Fig. 6
Fig. 5
Fig. 7
INVENTOR:
FRED B. MARTIN
By 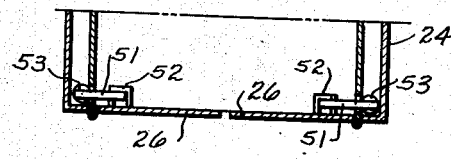
ATTORNEY Patented Mar. 31, 1953

2,633,253

UNITED STATES PATENT OFFICE 2,633,253

TRANSFER SYSTEM

Fred B. Martin, Goodland, Kans.

Application July 21, 1947, Serial No. 762,416

2 Claims. (Cl. 214—16.1)

This invention relates to a method and means for returning wheeled facility units to a desired position of initial availability after use and is directed to the provision of a novel and improved combination of elements correlated to constitute means for the automatic and cyclic manifestation of sequentially interrelated steps operatively effective to accomplish the desired end.

A principal object of the invention is to provide an improved system for the automatic transfer of wheeled facility units from an area of use termination to a common and convenient position of initial availability.

A further object of the invention is to provide an improved system for the automatic maintenance of a successive supply of wheeled facility units at a convenient position of initial availability with minimum appropriation of otherwise usable space.

A further object of the invention is to provide an improved system for the transfer of wheeled facility units that is characterized by capacity for unit storage in normally surplus space and immediately-available manner.

A further object of the invention is to provide an improved transfer system particularly applicable to the translation, storage, and delivery for use of wheeled shopping carts, and the like.

A further object of the invention is to provide an improved transfer system adapted for use in self-serve, and analogous, stores to minimize the congestion and floor space loss incident to conventional use and storage of wheeled shopping carts, and the like.

A further object of the invention is to provide an improved transfer system of the character and for the purposes set forth that is relatively simple and inexpensive of manufacture and operative installation, adaptable to extensive variation of specific structure and detail to fit the needs and requirements of particular locations, automatically responsive to manual charging and manual withdrawals to maintain a unit of its wheeled charge available in position for initial use, and positive and efficient in the attainment of the ends for which designed.

With the foregoing and other objects in view, my invention consists in the construction, arrangement, and combination of elements, in the system therefrom comprised, and in the method therethrough given effect, all as hereinafter set forth, pointed out in my claims, and illustrated by the accompanying drawings, in which—

Figure 5:
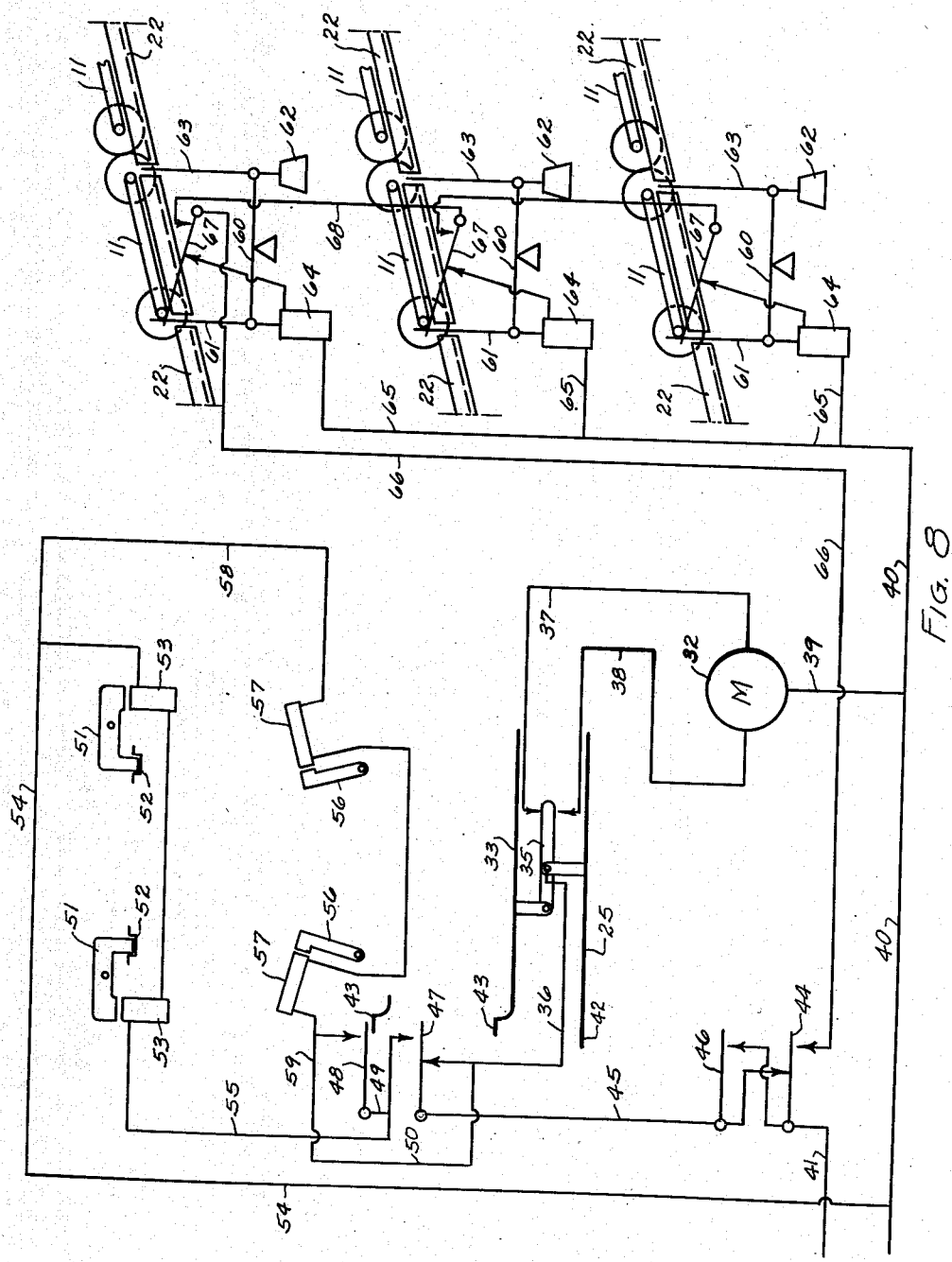

Figure 1 is a schematic elevation, partly in section, illustrating diagrammatically the elements and relationships essential to give effect to the principles of the invention. Figure 2 is a schematic plan view of the general organization according to Figure 1 as modified to accommodate a plurality of charging or receiving stations. Figure 3 is a face elevation of a typical receiving or charging station employable in and with the organization represented by the preceding views. Figure 4 is a side elevation of the showing of Figure 3. Figure 5 is a face elevation of a typical delivering station employable in and with the organization. Figure 6 is a side elevation of the showing of Figure 5. Figure 7 is a fragmentary, detail section, taken substantially on the indicated line 7—7 of Figure 5. Figure 8 is a conventionalized diagram of the electrical connections and controls effective to accomplish the desired actuation of the system elements shown.

Modern retail merchandising trends have been marked in many fields by the extensive development of so-called self-serve establishments wherein the customer selects desired items from open displays and transports the collected items to a check stand where the charge is computed, paid, and the purchases packaged for portage by the customer. As a convenience for the shopper in the selection and accumulation of desired items, most such self-serve establishments provide light-weight, usually double-deck, wheeled carts equipped with handled baskets and maintain a supply of such carts at a convenient point near the store entrance where they are accessible to the incoming shopper. The use of such carts, or facility units, terminates at the check stand where the unit is unloaded for checking of its charge and abandoned, thus necessitating the frequent attention of a store employee to the end that the abandoned carts be returned to the storage pool adjacent the store entrance and undue congestion of abandoned carts be avoided at the check stand. As a consequence of such practice, much valuable floor space otherwise available for display of merchandise is appropriated to accommodate the carts in the storage pool and in the area about the check stand, space must be left open for the shifting of the carts to their positions of initial availability, and valuable employee time is consumed, usually when such time is most needed for other services, in attending the carts and maintaining them in orderly disposition. Such being a quite general condition open to improvement and correction, the instant invention is directed to the provision of a novel method, system and means for the convenient and orderly administration of such carts in a manner that conserves space, employee time, minimizes congestion and confusion, and effectively serves the needs of shoppers and customers.

The improved method is susceptible of practice through a wide variety of structurally specific installations and consists, briefly, of charging the carts individually into a receiving station of automatic elevator type, which successively lowers the carts through the store floor and discharges them onto an inclined track where they roll by gravity to a delivering station, also of automatic elevator type, which elevates the carts successively through the store floor and into user accessibility at the desired point of initial availability, the inclined track length, with its possible branches, being designed to store the desired number of carts beneath the store floor, and the system being fully automatic in response to manual loading of the receiving station and manual retirement of load from the delivering station.

As represented by the drawings, the receiving station may include a hood 10, of suitable size and with one open vertical face through which a cart 11 may be freely accommodated, fixedly or telescopically associated with a floor 12 to upstand above the latter in surrounding relation with a floor aperture of a size adequate for the vertical passage of the cart. The hood 10 and associated floor aperture are conveniently located adjacent the customer entrance to the check stand, where the carts 11 are commonly abandoned, and the hood may be provided with a vertically-slidable door 13, or equivalent closure, latchable in obstructing relation with the hood open face, when desired. Shaft wall or vertical guide members 14, of any appropriate construction, are suitably associated with margins of the floor aperture and extend therebelow to reciprocably house an elevator platform 15 for altitudinal travel between registration with the floor 12 level and a lower position such as will dispose a cart carried thereby fully below and in clearing relation beneath said floor. The platform 15 is a rigid assembly including side members cooperable with the vertical guideways of the members 14 and arms 16 fixedly projecting through the guideslots of said members 14, so that said platform is positively maintained horizontal and is adapted for connection with counterbalancing weights 17, as by means of flexible elements 18 connecting between the arms 16 and weights 17 over and operatively about pulleys 19 secured under the floor 12 on opposite sides of the shaft structure 14, which are adjusted to maintain the unloaded platform 15 in registration with the floor 12 and to permit the weight of a cart 11 imposed on said platform to lower the latter through elevation of the weights. Hinged on a horizontal axis to the discharge edge of the platform 15, preferably the edge remote from the hood open face, a tiltable tray 20 is disposed to normally overlie the platform upper surface and to receive the wheels of a cart 11 rolled thereon from the floor 12, and is furnished with such guide ribs, stops, etc., as may be deemed expedient for the positioning and retention of a cart thereon. The margin of the tray 20 remote from its hinge axis preferably projects slightly beyond the corresponding margin of the platform and is hence disposed for engagement with a stop 21 fixed transversely of and bridging between the shaft members 14 adjacent the lower limit of the range of platform reciprocation and in such altitudinal relation with the platform lower limiting position as will operate to rock said tray about its hinge axis relative to the platform and incline the tray when the platform comes to rest in its lowermost position so that the cart 11 carried thereby will roll under the influence of gravity from said tray and onto and along a suitable track 22 fixedly supported with its receiving end registered with the tray and platform assembly in the gravity-discharging or delivering disposition of the latter at the lower end of its range of travel. Thus, the platform 15 with its horizontally superposed tray 20 is normally held by the counterbalancing means at the level of the floor 12 in position to receive a cart 11 manually pushed within the hood 10, and the platform assembly travels downward in response to the added cart weight, carrying the cart, until the tray encounters the stop 21 and is thereby tilted to deliver its cart burden to the track 22, whereafter the unburdened platform assembly returns to its normal floor-flush position ready to receive and transfer another cart. While not essential to successful operation of the system, it is desirable that the hood 10 open face and the shaft delivery side be opposed, as shown, so that a cart entered on the platform with its manipulating handle rearward, or toward the hood open face, rolls forwardly away from the tray 20 and onto the track 22 with its manipulating handle trailing in the direction of its travel.

The track 22 is of such suitable specific construction, including grooves or channels for the guiding reception of the cart wheels, as may be desired, and extends at a constant inclination effective for the gravity feed of carts 11 therealong beneath the floor 12 in a length, either straight or curved, such as will communicate in serving relation with the delivering station of the system and provide storage accommodation for the desired number of carts. As will be obvious, a number of receiving stations may be incorporated in a given system as the needs of a particular installation may indicate, and each of said stations may deliver to a separate track 22 which, through suitable switches and automatic controls, feeds its charge to a common loading ramp serving the delivering station; or, when expedient, a plurality of parallel tracks 22 may be provided for enhanced storage capacity between the receiving and delivering stations of a given system in an automatically operative arrangement of switches and controls effective to direct incoming carts to the unfilled trackage and to feed carts from the filled trackage to the delivering station; all such variations of arrangement being within the contemplation of the invention, obvious enlargements or expansions of the simple, single-track example, and susceptible of realization through the exercise of ordinary skill applied to the operative assembly and correlation of known devices and facilities.

Customarily, but one delivering station is incorporated in each given installation of the improved system and such station is disposed adjacent the customer ingress to the store in an arrangement facilitating customer access to the cart units presented thereby. Somewhat comparable to the receiving station or stations of the system, the delivering station includes a shaft-defining housing 23 fixedly depending beneath the floor 12 a distance greater than the depth of the receiving station shaft and registering at its upper end with an aperture of suitable size opening through said floor, and a hood 24 upstanding from the floor 12 about and in covering relation with said aperture. The housing 23 reciprocably accommodates an elevator platform assembly 25 power-actuatable between a lowermost position characterized by cart-receiving registration with the delivery end of the track 22 and an uppermost position from which its cart charge may be smoothly rolled to the floor 12 upper surface, the said platform assembly automatically remaining in its lowermost position until cart-laden, then automatically rising to its uppermost position where it remains until removal of its cart charge automatically serves to lower the unburdened assembly for recharge and repetition of its operative cycle. The housing 23 has an access aperture in its wall served by the track 22 through which carts 11 may successively roll from said track and to the housing interior, and the hood 24 has a cart-accommodating face opening, preferably in that side most nearly adjacent the cart manipulating handle as presented within the hood, which, because the assembly 25 may remain for some time at the bottom of its shaft to expose the floor aperture within the hood, is normally closed by door panels 26 swingable through horizontal arcs when a cart is drawn from within the hood outwardly thereagainst and arranged for automatic latched retention in hood-closing relation when the assembly 25 is in other than aperture-closing position.

The structural organization of operating elements and controls effective to accomplish the functions and purposes of the delivering station in the manner above outlined may vary widely, the operatively typical arrangement of means shown in the drawings and hereinafter described being but representative of many other functionally equivalent combinations. In the illustrated embodiment, the platform assembly 25 has a rigid base portion furnished with members slidably engaged in vertical guide slots in the housing 23, whereby said assembly is directed and restrained to a precise travel path altitudinally of said housing, and with arms 27 fixedly projecting oppositely from said base portion through the housing guide slots for connection with cables, or like flexible connectors, 28 which rise along the walls of the housing and over direction-changing pulleys 29 to winding association with drums 30 spaced apart on a horizontal shaft 31 in driven relation with a reversible electric motor 32 at one side of the housing. Obviously, when the motor 32 is energized to rotate the shaft 31 and drums 30 in one direction, the cables 28 are wound upon said drums with consequent elevation of the platform assembly, and when said motor is energized for rotation in the opposite direction, the cables are caused to unwind from said drums with consequent descent of the platform assembly. Actuation and positioning of the platform assembly being a function of the presence or absence of weight imposed by a cart charge thereon, it is convenient to equip the platform assembly base portion with a cart-receiving, relatively-movable deck 33 horizontally disposed as an assembly upper element and altitudinally shiftable, conveniently through the agency of a counterweight 34, toward and away from the platform base portion in respective response to the presence or absence of a cart 11 in supported relation upon said deck 33. The said deck 33 may be supplied with such wheel guides and stops as may be deemed expedient, and is of such altitudinal disposition as to register with the associated end of the track 22 for reception of a cart therefrom when the platform assembly is at the lowermost limit of its range of travel and to register with the floor 12 upper surface when the cart-loaded assembly is at the upper limit of its travel range. The altitudinally-shiftable mounting of the deck 33 relative to the platform assembly base portion may conveniently be utilized for the automatic positioning of a reversing switch wherethrough the motor 32 is served with energy in a manner to determine the direction of motor rotation, such a switch being represented in Figure 8 by an arm 35 mounted for oscillation through a vertical arc on the assembly base portion and linked to the deck 33 so that energy flowing through a circuit branch 36 whereof said arm is a part is directed through a lead 37 to one side of the motor 32 when said deck is depressed in response to cart load, and alternatively through a lead 38 to the other side of said motor when said deck is relatively elevated due to absence of cart load; the operative circuit to said motor being completed through a lead 39 to a supply conductor 40, and switches and controls hereinafter to be described, so that said motor is caused to rotate in a direction effective to elevate the platform assembly when the deck 33 is loaded to establish the circuit through the lead 37 and to rotate in the opposite direction, for lowering of the platform assembly, when the deck is charge-free and the circuit consequently established through the lead 38.

Operative connection of the branch 36 with the other supply conductor 41 is effected through switches reactive to the relative positions of the platform assembly base portion and the deck 33, both with respect to the housing 23 and to each other. The platform assembly base portion is equipped with a fixedly-associated trip finger 42 reciprocable therewith into and out of engagement with and for the actuation of certain springloaded switches, and the deck 33 is similarly equipped with a fixedly-associated trip finger 43 for engagement with an actuation of other springloaded switches. A switch arm 44 connects with the supply conductor 41 and is spring-urged into closing engagement upwardly against a contact point serving a lead 45, said arm 44 being operatively disposed for engagement by the trip finger 42 and consequent displacement out of circuit-closing relation with the lead 45 when the platform assembly base portion reaches the lower limit of its range of travel. Adjacent and spaced above the switch arm 44 a distance less than the maximum altitudinal separation between the trip fingers 42 and 43 and greater than the minimum such separation therebetween, a second switch arm 46 connects with the lead 45 and is normally spring-held just out of circuit-closing engagement with and above a contact point served by the conductor 41. With such an arrangement, so long as the platform assembly is at any point other than its lower travel limit, a circuit is established from the conductor 41, through the arm 44, and to the lead 45, the arm 46 being non-functioning, but when the unloaded platform assembly descends, with its uncharged deck 33 at the maximum separation above the assembly base portion, the finger 42 oscillates the arm 44 against its spring load and interrupts the flow path from conductor 41 to lead 45, such interruption occurring when the finger 43 overhangs just out of engagement with the arm 46. The platform assembly being at rest in its lowermost position, progress of a cart 11 from the track 22 to the deck 33 serves to depress the latter and as a consequence the finger 43 is moved downwardly to oscillate the arm 46 into engagement with its associated contact point and thereby reestablish the circuit from the conductor 41 and to the lead 45. The lead 45 serves the motor 32, as will hereinafter appear, through the lead 36, switch arm 35, and alternative leads 37 and 38, so that reestablishment of the circuit to said lead 45 serves to initiate power elevation of the platform assembly with immediate reoscillation of the arms 44 and 46 to the relationship wherein the former closes the flow path to the lead 45 and the latter is again non-functioning.

Adjacent the upper limit of the platform assembly travel range, a spring-loaded switch arm 47 is served by the lead 45 and is disposed for upward oscillation against its spring load by the trip finger 42 when the platform assembly reaches its uppermost position. The arm 47 is normally spring-closed against a contact point which serves the lead 36, so as long as said arm is free to react to its spring, a circuit is established from the lead 45, through the arm 47, and to the lead 36, thence through the switch 35 and lead 37 and 38 to the motor 32, but when said arm 47 is moved by the final ascent of the finger 42, such circuit is interrupted and no current can flow to the motor. Adjacent and spaced above the arm 47 a distance greater than the minimum altitudinal separation between the fingers 42 and 43 and less than the maximum such separation, a spring-loaded switch arm 48 is served by a lead 49 from a contact point against which the arm 47 engages when forced upwardly by the finger 42 and is disposed in the path of finger 43 travel relative to the finger 42 for upward oscillation into engagement with a contact point serving a lead 50 which in turn connects with the lead 36. Thus, the cart-loaded platform in its approach to uppermost position oscillates the arm 47 against its spring load to interrupt the circuit therethrough to the lead 36, thereby arresting the motor 32, and engages said arm 47 with the contact point serving the lead 49 to thereby potentialize the arm 48. So long as the cart remains on the deck 33, depressing the latter, the circuit to the motor is interrupted at the arm 48 as well as at the arm 47, but when the cart load is withdrawn from the deck and the latter rises, the finger 43 oscillates the arm 48, establishing a circuit from the lead 45 through the arm 47, lead 49, arm 48, and lead 50 to the lead 36 and thence, through the now reversed switch 35, to the motor 32 for actuation of the latter in a direction effective to lower the platform assembly, now unloaded, and repeat the operative, automatic cycle.

In the interests of safety, the switch arms 47 and 48 may be utilized for the automatic control of latches effective to support the platform assembly against accidental or unintentional descent from its uppermost discharging position and to hold the closures 26 locked across the access face of the hood 24 when the platform assembly is in any other than its uppermost discharging position. As indicated, latch bolts 51 may be pivoted for oscillation in vertical arcs across and interiorly adjacent the hinged margins of the closure members 26 with their pivotal supports fixed to elements of the hood 24 and their opposed inner ends adapted for normal gravity engagement within keepers 52 appropriately secured to inner faces of the members 26, such engagement serving to latch and hold said members 26 in closing relation across the hood 24 access face, and an electromagnet 53 is fixed to the hood 24 in operative relation with the outer end of each bolt 51 so that energization thereof acts to depress the associated bolt 51 outer end and thereby lift the bolt inner end from its keeper 52 to free the corresponding member 26 for hood-opening actuation about its hinge mounting, preferably against the pressure of a hinge spring disposed to normally urge the panel member into hood-closing position. The electromagnets 53 are included in an energizing circuit whereof one lead 54 may connect with the conductor 40 and the other lead 55 connects with the lead 49 effective to potentialize the switch arm 48 when the switch arm 47 is actuated as a consequence of platform assembly elevation to its uppermost position. Thus, when the cart-charged platform assembly is arrested in its uppermost position, the closure members 26 are automatically unlatched to permit withdrawal of the cart charge from the platform assembly through the hood 24 access face and to the floor 12, said members swinging to hood-closing position when the cart has been fully withdrawn therethrough, and as soon as the platform assembly descends sufficiently to return the switch arm 47 to its normal, spring-urged engagement against the contact point serving the lead 36, the circuit to the electromagnets 53 is interrupted, resulting in deenergization thereof and consequent memberlatching engagement of the bolt 51 inner ends with the keepers 52.

Immediately below the platform assembly upper limit position in a pivotal mounting on axes fixed relative to the shaft housing 23 such as will permit them to swing by gravity inwardly into end-latching engagement beneath elements of the platform assembly base portion, dogs 56 are provided, each reactive to an electromagnet 57 effective upon energization to oscillate its associated dog 56 outwardly from beneath the platform assembly and thereby clear the platform travel path for descent of the assembly. The electromagnets 57 are included in a circuit whereof one lead 58 connects with the conductor 40, conveniently through the lead 54, and the other lead 59 connects with the lead 50 potentialized when the switch arm 48 is actuated as a consequence of deck 33 rise resulting from removal of the cart load therefrom. With such an arrangement, the dogs 56 normally obtrude into the platform assembly path to swing outwardly for accommodation of the assembly as the latter rises into its uppermost position and to return inwardly into latching engagement beneath the said assembly when the latter attains its upper position, in which latching relation said dogs remain until removal of the cart load permits relative rise of the deck 33 and consequent initiation of platform assembly descent, which deck rise operates to energize the electromagnets 57 for oscillation of the dogs into temporary clearing relation with the path of platform descent.

Since the track or tracks 22 accommodate a succession of carts 11 in free-rolling end engagement with one another and it is expedient to permit but a single cart to roll forward onto the elevating platform deck 33 at each occasion of platform assembly descent to its lowermost, or charging, position, means automatically responsive to such positioning of the platform assembly for the normal retention of the cart succession behind a given forward point of their respective track or tracks and for the release of but a single cart from such succession to effect loading of the platform assembly, is provided. Such means is susceptible of practical development through a variety of particular structural organizations and is typified by the arrangement shown in Figure 8 as applied to the control of cart translation along three parallel tracks 22. As shown, a rock-arm 60 is fulcrumed for oscillation through a vertical arc in longitudinal alignment with and beneath the track 22 portion where it is desired to check the cart advance, and the forward end of said arm is operatively equipped with a stop member 61 upstanding vertically therefrom and reciprocable as a consequence of arm 60 oscillation through the track 22 into and out of obstructing relation with the path of travel along said track of a cart fixed element, such as an axle, and the said arm 60 is normally positioned, as by means of a counterweight 62, to project the stop member 61 upwardly above the associated track 22 and into position to engage with the leading cart 11 of the succession upon said track and hold said cart, and consequently those following, against further travel forwardly along the track. At its other, or rearward, end, the arm 60 is operatively equipped with a second stop member 63, similar to the member 61, spaced rearwardly from the latter a distance suitable to freely accommodate but one cart 11 therebetween, and proportioned to the member 61 in length so that when the latter is elevated to obstruct cart travel along the track the member 63 is downwardly retracted to clear the track path for cart travel, and when the member 61 is retracted to free the leading cart 11 for further progress along the track, the member 63 is elevated into position to bar further advance of the second cart of the succession. The arm 60 is adapted for selective actuation by means of a solenoid, or electromagnet 64, operatively associated therewith, preferably to depress the forward end thereof, and included in a circuit whereof one lead 65 connects with the conductor 40 and the other lead 66 connects with a contact point against which the switch arm 44 closes for connection of the conductor 41 therewith when said switch arm is moved against the pressure of its spring from normal position as a consequence of platform assembly descent to lowermost, or charging, position. Thus, with but a single transfer and storage track 22, the arm 60 is normally disposed, with the solenoid 64 deenergized, for elevation of its stop member 61 and retraction of its stop member 63, so that the carts 11 charged upon said track from the system receiving station roll forwardly and downwardly along the track until the leading cart is stopped and held by the member 61 and the following carts are retained in an end-engaged succession therebehind, in which relation said carts remain when the platform assembly of the delivering station is in any position other than its lowermost, or charging, location. When the platform assembly 25 descends into position for charging of its deck 33 with a cart 11, the switch arm 44 is depressed to close the circuit from the conductor 41 through the lead 66 and to the solenoid 64, thereby energizing the latter to rock the arm 60 for retraction of the stop member 61 and elevation of the stop member 63 with consequent release of the leading cart 11 of the succession to roll forwardly along the track 22 and onto the platform deck 33 and checking of the second cart 11 of the succession against forward travel. As a consequence of its charging, the platform assembly 25 automatically rises, thus breaking the circuit serving the solenoid 64 and permitting reverse rocking of the arm 60 to elevate the stop member 61 and retract the stop member 63, whereupon the succession of carts 11 moves forwardly along the track until the leading cart is checked by the stop member 61 in position for repetition of the charging cycle.

Where a plurality of tracks 22 serves a single delivering station, it is expedient to provide means automatically effective to accomplish delivery of a cart to the station from a cart-charged track, in the event one or more of the other tracks be empty, and this may readily be done in the manner and through the typical means hereinafter described. An elongate switch arm 67 may be hingedly associated with and beneath each track 22 section to extend upwardly and forwardly therethrough for oblique intersection of the leading cart path of travel in the forward arrested position of said cart, and said arm 67 is spring-loaded for resilient retention thereof in position for sliding engagement with a fixed element of said leading cart. The lead 66 connects with and potentializes the arm 67 and a pair of contact points are spaced apart on the opposite sides of and for alternative engagement by said arm as the latter is caused to swing about its hinge mounting. When a cart 11 is on the track section associated with a given arm 67 and against the stop member 61 of said section, the said arm 67 is rocked through engagement with said car to close a circuit through its lower contact point and to the associated solenoid 64, thereby conditioning that portion of the system for operative reaction to platform assembly disposition and for feeding of carts to the latter as above described. However, should the leading cart position of a track section be vacant, the arm 67 rises by virtue of its spring-loading to close against its upper contact point, thereby interrupting the circuit to its solenoid 64, whence a lead 68 transmits the potential of said arm successively to and similarly through the like arm 67 elements of the track 22 sections comprised in the system, thus conditioning the system for automatic delivery of carts from a loaded track to the elevating or delivering station, as above set forth.

The apparatus and combinations thereof shown and described constitute a complete and automatic system effectively operable through manual introduction of successive carts to the receiving station and selective withdrawal of conveniently-presented carts from the delivering station to transfer and store said carts in an efficient manner conservative of floor space and employee time. The system is readily adaptable to varying needs and to functioning with any desired number of receiving and delivering station; it being feasible, if deemed expedient, to arrange the receiving station for power, as distinguished from gravity, actuation in a manner comparable to that set out in connection with the delivering station.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A system for the transfer and storage of wheeled carts, comprising hooded shafts spacedly intersecting a floor, elevators operatively within said shafts, a track inclined for the gravity induced transit of wheeled units therealong operatively communicating between lower ends of said shafts, means for normally maintaining the charge-free elevator of the shorter shaft at floor level for automatic descent and transfer of its charge to said track in reaction to the weight of a wheeled unit imposed thereon, means reactive to charge removal for automatically lowering the charge-free elevator of the longer shaft to registration with said track for the reception of a charge therefrom and for returning the charged said elevator to floor level and retaining the elevator there until relieved of its charge, and means for automatically feeding individual units from said track and to the elevator of the longer shaft when said elevator is in charge-receiving registration with said track, wherein the means for automatically lowering the charge-free elevator of the longer shaft includes electrical power means actuatable to raise and lower said elevator, a charge-receiving deck horizontally superposed on and weight-adjustable altitudinally with respect to said elevator, a reversing switch alternatively positionable by the weight-controlled relation of said deck to said elevator, a circuit serving said power means through said reversing switch, and a triggering switch in said circuit reactive to weight-freed rise of said deck relative to said elevator to close said circuit and energize said power means.

2. A system for the transfer and storage of wheeled carts, comprising hooded shafts spacedly intersecting a floor, elevators operatively within said shafts, a track inclined for the gravity induced transit of wheeled units therealong operatively communicating between lower ends of said shafts, means for normally maintaining the charge-free elevator of the shorter shaft at floor level for automatic descent and transfer of its charge to said track in reaction to the weight of a wheeled unit imposed thereon, means reactive to charge removal for automatically lowering the charge-free elevator of the longer shaft to registration with said track for the reception of a charge therefrom and for returning the charged said elevator to floor level and retaining the elevator there until relieved of its charge, and means for automatically feeding individual units from said track and to the elevator of the longer shaft when said elevator is in charge-receiving registration with said track, wherein the means for automatically returning the charged elevator of the longer shaft to floor level includes electrical power means actuatable to raise and lower said elevator, a charge-receiving deck horizontally superposed on and weight-adjustable altitudinally with respect to said elevator, a reversing switch alternatively positionable by the weight controlled relation of said deck to said elevator, a circuit serving said power means through said reversing switch, and a triggering switch in said circuit at the lower end of said shaft reactive to weight-charged descent of said deck relative to said elevator to close said circuit and energize said power means.

FRED B. MARTIN.

REFERENCES CITED

The following references are of record in the file of this patent:

UNITED STATES PATENTS

| Number | Name | Date |
|---|---|---|
| 923,355 | Green | June 1, 1909 |
| 982,056 | Hammell | Jan. 17, 1911 |
| 1,170,032 | Williams | Feb. 1, 1916 |
| 1,521,700 | Mitchell | Jan. 6, 1925 |
| 1,770,018 | Stillman | July 8, 1930 |
| 1,849,385 | Sekulski | Mar. 15, 1932 |

FOREIGN PATENTS

| Number | Country | Date |
|---|---|---|
| 587,471 | France | Jan. 19, 1925 |
| 2,450 | Great Britain | June 25, 1877 |